(12) United States Patent
Yoshimura et al.

(10) Patent No.: US 7,039,322 B1
(45) Date of Patent: *May 2, 2006

(54) OPTICAL COMMUNICATION APPARATUS

(75) Inventors: Tomonari Yoshimura, Aichi (JP); Noritaka Saito, Aichi (JP); Akimitsu Okita, Aichi (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/868,994

(22) PCT Filed: Nov. 21, 1999

(86) PCT No.: PCT/JP99/07177

§ 371 (c)(1),
(2), (4) Date: Jun. 22, 2001

(87) PCT Pub. No.: WO00/39614

PCT Pub. Date: Jul. 6, 2000

(30) Foreign Application Priority Data

Dec. 24, 1998 (JP) .................................. 10-367308
Jul. 12, 1999 (JP) .................................. 11-197851

(51) Int. Cl.
*H04B 10/12* (2006.01)

(52) U.S. Cl. .................... 398/141; 398/140; 398/142; 398/28; 398/25; 385/35; 385/33; 385/31; 385/143; 385/145; 428/375; 428/373; 428/378; 428/394

(58) Field of Classification Search ............... 398/140, 398/141, 142, 28, 25; 385/35, 33, 31, 143, 385/145; 428/375, 373, 378, 394
See application file for complete search history.

(56) References Cited

U.S. PATENT DOCUMENTS 4,693,553 A * 9/1987 Sasaki et al. ............... 385/143

(Continued)

FOREIGN PATENT DOCUMENTS

EP 1 059 544 A1 12/2000
JP 63095402 A 4/1988

(Continued)

OTHER PUBLICATIONS

Patent Abstracts of Japan, No. 63094203 A (Apr. 1988).

(Continued)

*Primary Examiner*—Hanh Phan
(74) *Attorney, Agent, or Firm*—Fitch, Even, Tabin & Flannery

(57) ABSTRACT

An optical communication apparatus comprises an optical transmitter (1) which emits light signals corresponding to external electric signals (11) using light emitted from a short-wavelength light-emitting element (14) such as a yellow light-emitting diode of maximum wavelength in a range of 560–590 nm or a green light-emitting diode of maximum wavelength in a range of 490–550 nm; a plastic fiber (2) including a methacrylate polymer core free from benzene rings and having one end connected optically with the short-wavelength light-emitting element (14), the core containing less than 5 ppm free sulfur; and an optical receiver (3) having a photodetector element (31) connected optically with the other end of the plastic fiber (2) and adapted to producing an output electric signal (35) in accordance with the output from the photodetector element (31).

11 Claims, 4 Drawing Sheets

U.S. PATENT DOCUMENTS 5,324,802 A     6/1994   Krieg
6,157,757 A * 12/2000   Giaretta et al. ............... 385/35
6,777,083 B1 * 8/2004   Mizota et al. ............... 428/373

FOREIGN PATENT DOCUMENTS

| | | |
|---|---|---|
| JP | 02043506 A | 2/1990 |
| JP | 5-186510 | 7/1993 |
| JP | 6-128327 A | 5/1994 |
| WO | WO99/44083 | 9/1999 |

OTHER PUBLICATIONS

Patent Abstracts of Japan, No. 02158702 A (Jun. 1990).
Patent Abstracts of Japan, No. 08116309 A (May 1996).
Patent Abstracts of Japan, No. 09318853 A (Dec. 1997).
Krieg, "Process for Preparing Polymethylmethacrylate By Mass Polymerization", EP 0519362, (Dec. 1992).
International Search Report.

* cited by examiner

OPTICAL COMMUNICATION APPARATUS

TECHNICAL FIELD

The present invention relates to a technique for optical communication using a plastic optical fiber, and particularly to an optical communication apparatus aiming to enhance heat resistance and perform long-distance communication.

BACKGROUND TECHNIQUE

Following recent increasing demands of optical communications using plastic optical fibers such as LAN, etc., increase in the communication distance and enhancement of resistance to environments, particularly resistance to heat (which means that the transmission characteristic is not varied with respect to the temperature variation) have been required.

A plastic optical fiber having a core made of methyl methacrylate polymer has been widely used as an optical transmission path for optical communications because it has advantages such as low absorbance, etc. A red light-emitting diode is generally used in an optical communication apparatus using such a plastic optical fiber as an optical transmission path.

In the conventional optical communication apparatus using a red light-emitting diode and a plastic optical fiber having a core made of polymethylmethacrylate resin as described above, the wavelength of light emitted from a light source is liable to vary due to temperature variation, and the variation of the wavelength of the emitted light sharply increases transmission loss of the plastic optical fiber. Particularly in the case of a light-emitting element having a broad full width at half maximum of wavelength, the wavelength components other than those around 650 nm in wavelength are sharply attenuated. Therefore, the transmission loss is increased and thus it is difficult to perform long-distance optical communication (transmission). For example, the transmission of about 100 m at maximum can be performed by an optical communication apparatus using a plastic optical fiber which is currently on the market.

Recently, blue and green light-emitting diodes (LED) having high output power have been developed, and they have been expected to be used as light sources for optical communications. For example, JP(A)-8-116309 discloses that a blue light-emitting element is used as a light source for an optical communication apparatus from the viewpoint of the resistance to heat.

Since the optical communication apparatus disclosed in JP(A)-8-116309 uses the blue light-emitting element as a light source, the heat resistance of the light source itself is excellent. However, when this light source is used in combination with a plastic optical fiber, the heat resistance of the plastic optical fiber becomes lower.

That is, as disclosed in JP(A)-8-116309, the blue light-emitting element for emitting light having short wavelength has little effect on the light emission characteristic due to the temperature variation because it has a broad forbidden band width, and thus the heat resistance thereof is excellent. However, in the conventional plastic optical fiber, electron transition absorption due to thermal oxidation deterioration of the optical fiber more remarkably occurs to light having shorter wavelength, and thus the transmission loss is more greatly increased in the blue region.

Further, JP(A)-9-318853 discloses an optical transceiver for performing bi-directional communications through a single-core optical fiber, which uses a yellow light-emitting element for emitting light of 570 nm in wavelength and a plastic optical fiber having a core formed of polymethylmethacrylate. However, this optical transceiver carries out the bi-directional communications through a single core, and thus it does not aim at long-distance transmission. Therefore, it has a drawback that S/N is too low to carry out the long-distance optical transmission.

Still further, the optical communication apparatus disclosed in JP(A)-8-116309 and the optical transceiver disclosed in JP(A)-9-318853 are not suitable for long-distance transmission because the optical fibers used in these apparatuses are not suitable for optical transmission in a short-wavelength range such as blue, yellow, etc.

SUMMARY OF THE INVENTION

The present invention has been implemented in view of the problem of the conventional techniques as described above, and has an object to provide an optical communication apparatus using a plastic optical fiber which has excellent heat resistance and can perform long-distance transmission.

In order to attain the above object, according to the present invention, there is provided an optical communication apparatus, comprising:
  an optical transmitter having a short-wavelength light-emitting element for emitting light signals corresponding to electrical signals input from the outside by using light emitted from the short-wavelength light-emitting element;
  a plastic optical fiber having a core made of methacrylate polymer free from benzene rings, the amount of sulfur atoms that are not bound to the polymer in the core being set to 5 ppm or less, one end of the optical fiber being optically coupled to the short-wavelength light-emitting element; and
  an optical receiver having a photodetecting element coupled optically to the other end of the plastic optical fiber and adapted to generate an output electrical signal in accordance with the output of the photodetecting element.

In an aspect of the present invention, the amount of sulfur atoms that are not bound to the polymer in the core is set to 3 ppm or less.

In an aspect of the present invention, the amount of sulfur atoms that are bound to the polymer in the core is set to a value in the range from 200 to 1000 ppm.

In an aspect of the present invention, the short-wavelength light-emitting element emits light having the maximum light emission wavelength of 600 nm or less. In an aspect of the present invention, the short-wavelength light-emitting element is a yellow light-emitting diode for emitting light having the maximum light emission wavelength of 560 to 590 nm or a green light-emitting diode for emitting light having the maximum light emission wavelength of 490 to 550 nm.

Further, in order to attain the above object, according to the present invention, there is provided an optical communication apparatus, comprising:
  an optical transmitter having a yellow light-emitting element for emitting light signals corresponding to electrical signals input from the outside by using light emitted from the yellow light-emitting element;
  a plastic optical fiber having a core made of methacrylate polymer free from benzene rings, one end of said optical fiber being optically coupled to the yellow light-emitting element; and an optical receiver having a photodetecting element coupled optically to the other end of the plastic optical fiber and adapted to generate an output electrical signal in accordance with the output of the photodetecting element, wherein the plastic optical fiber is designed so that light propagates in only one direction.

In an aspect of the present invention, the amount of sulfur atoms that are not bound to the methacrylate polymer in the core is set to 5 ppm or less, preferably 3 ppm or less.

In an aspect of the present invention, the yellow light-emitting element comprises a light emission diode which has the maximum light emission wavelength in the range from 560 nm to 590 nm, the full width at half maximum of wavelength of 40 nm or less and the total emission light amount of 0 dBm or more, the plastic optical fiber has a transmission loss of 0.1 dB/m or less at the wavelengths of 560 to 590 nm, and the connection loss between the yellow light-emitting element and the plastic optical fiber is equal to 10 dB or less, and the optical receiver has the minimum reception sensitivity of −25 dBm or less at the wavelengths of 560 to 590 nm.

BEST MODES TO IMPLEMENT THE INVENTION

Figure 1:
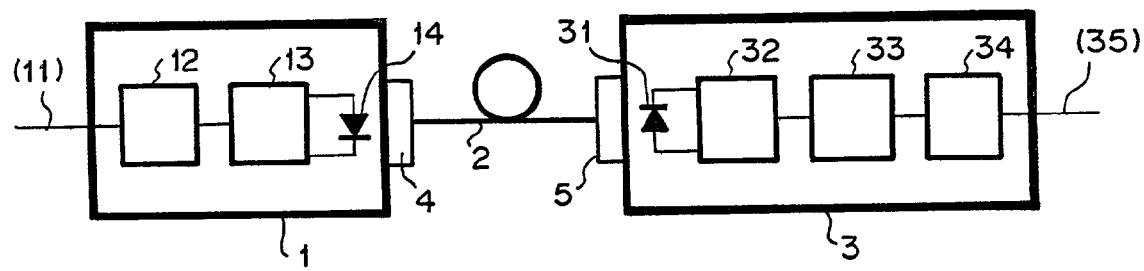
FIG. 1 is a block diagram showing the construction of an embodiment of an optical communication apparatus according to the present invention.

In an optical communication apparatus of the present invention, an optical transmitter is connected to one end of a plastic optical fiber, and an optical receiver is connected to the other end of the plastic optical fiber. Light emitted from the optical transmitter propagates through the plastic optical fiber to the optical receiver.

In the present invention, a short-wavelength light-emitting element of the optical transmitter is a light-emitting element having the maximum light emission wavelength shorter than that of a red light-emitting element (the maximum light emission wavelength of 640 to 670 nm) serving as a light source used in the conventional optical communication apparatus having the plastic optical fiber. As the short-wavelength light-emitting element may be used a light-emitting element having the maximum light emission wavelength of 600 nm or less, such as a yellow light-emitting element having the maximum light emission wavelength of 560 to 590 nm or a green light-emitting element having the maximum light emission wavelength of 490 to 550 nm. The maximum light emission wavelength of the short-wavelength light-emitting element is set to 400 nm or more, for example.

For example, GaN-based or ZnSe-based laser diodes or light emission diodes (LED) may be used as the green light-emitting element, and InGaN-based or InGaAlP-based laser diodes or LEDs may be used as the yellow light-emitting element. Since it is generally difficult at present to achieve a green light-emitting laser diodes and a yellow light-emitting laser diodes, it is preferable to use green light-emitting LED or yellow light-emitting LED. Of these LEDs, GaN-based green light-emitting LED or InGaN-based yellow light-emitting LED is particularly preferable because they have a large light emission amount. Further, in order to reduce the full width at half maximum of wavelength of the short-wavelength light emitting LED, LED having a quantum well structure is preferably used.

In order to achieve long-distance transmission of 150 m or more, for example, LED of 40 nm or less in full width at half maximum of wavelength and 0 dBm or more in total emission light amount is preferably used as the short-wavelength light-emitting element such as the yellow light-emitting element or the like. In order to reduce the full width at half maximum of wavelength of the short-wavelength light-emitting LED such as the yellow light-emitting LED or the like, LED having a single quantum well structure is preferably used.

The optical transmitter may be designed in a well-known structure. For example, it may be constructed by the above short-wavelength light-emitting element, a driving circuit for driving the short-wavelength light-emitting element, a modulation circuit for modulating electrical signals input from the external and supplying the modulated electrical signals to the driving circuit.

A well-known plastic optical fiber having a core portion through which propagating light mainly passes may be used. For example, a step index type optical fiber having a core/clad structure in which the refractive index varies sharply at the interface between the core and the clad, or a graded index type optical fiber in which the refractive index of the core portion is continuously reduced from the center to the outer periphery thereof may be used. Further, in order to reduce the bending loss, it is preferable to use a multi-core type plastic optical fiber in which plural cores are unified into one body while they are separated from one another through sea form material. In order to broaden the transmission band, it is preferable to use a plastic optical fiber having a core portion formed by coaxially multi-layering (co-)polymer materials which are different in refractive index, the refractive index of the core portion being stepwise reduced from the center to the outer periphery. Such a plastic optical fiber can be achieved by a well-known method, and it can be manufactured by a composite melt spinning method, for example. For example, in order to perform long-distance transmission of 150 m or more, it is preferable to use a plastic optical fiber having a transmission loss of 0.1 dB/m or less over the light emission wavelength range of the short-wavelength light-emitting element (when a yellow light-emitting element is used as the short-wavelength light-emitting element, the range from 560 nm to 590 nm in wavelength).

Methacrylate polymer containing no benzene ring is used as the material of the core portion. An optical fiber using methacrylate polymer having no benzene ring as the core material has an excellent transmission characteristic particularly to light emitted from a short-wavelength light-emitting element such as a yellow light-emitting element or a green light-emitting element used in the optical communication apparatus according to the present invention. A methyl methacrylate polymer is preferably used as the methacrylate polymer. As a methyl methacrylate polymer is preferably used polymer containing methyl methacrylate of 60 wt % or more, and more preferably used polymer containing methyl methacrylate of 80 wt % or more. Fluorinated alkyl methacrylate is preferably used as monomer to be copolymerized with methyl methacrylate, and 2,2,3,3-tetrafluoropropyl methacrylate is particularly preferably used from the viewpoint of implementation of a low-loss optical fiber. Particularly in the case where an optical fiber having a core portion formed by coaxially multi-layering (co-)polymer materials which are different in refractive index is used, if the respective layers constituting the core portion are formed of the (co-)polymers of methyl methacrylate and 2,2,3,3-tetrafluoropropyl methacrylate which are different in copolymerization composition ratio, it is preferable because the long-distance transmission can be carried out on high-speed signals.

In the manufacturing process of the polymer for the core material, a mercaptan-based chain transfer agent is preferably used to adjust the molecular weight of the polymer for the purpose of adjusting the viscosity of the polymer when it is melted in a process of shaping the polymer into an optical fiber and preventing increase of scattering factors due to structuring in the shaping process. Sulfur components in the chain transfer agent which are bound to the polymer due to a chain transfer reaction enhance neither the light absorption loss when heated nor the scattering loss when humidified, and rather these components enhance the resistance to thermal decomposition of the optical fiber.

The content of sulfur atoms bound to the polymer in the core material is preferably equal to 200 ppm or more, and more preferably to 400 ppm or more. If the content of sulfur atoms bound to the polymer is excessively small, the resistance to thermal decomposition of the core material is insufficient, or the melting viscosity is excessively increased so that the shaping of the optical fiber may be difficult. Further, in order to prevent the difficulties of the shaping of the optical fiber due to the excessively reduction in melting viscosity of the core material, the content of sulfur atoms bound to the polymer is preferably set to 1000 ppm or less, and more preferably set to 800 ppm or less.

As the polymer for the core material is preferably used polymer including a small content of sulfur atoms which are not bound to the polymer, for example, non-reacted mercaptan and disulfide compounds generated through the reaction of mercaptan, etc. (such a content of sulfur is hereinafter merely referred to as "residual sulfur amount"). The content of sulfur atoms which are not bound to the polymer is preferably set to 5 ppm or less, and more preferably to 3 ppm or less, particularly preferably to 1 ppm or less. If a large amount of sulfur atoms which are not bound to the polymer exist in the core material, coloring occurs due to thermal history when the spinning process is carried out, and thus the absorption loss in the wavelength range of 600 nm or less, particularly in the wavelength range of 490 to 590 nm used mainly in the present invention may be increased. Further, the heat resistance of the optical fiber in the wavelength range is caused to be deteriorated.

Such core material can be achieved as follows. That is, monomers serving as raw material of the core material are partially polymerized to obtain reaction mixture, and then the reaction mixture is degasified under a proper condition by using a vented extruder disclosed in JP(B)-52-17555 for example. In this case, it is preferable that reaction mixture containing polymer of preferably 30 to 70 wt% is beforehand heated to increase the temperature thereof to 170° C. or more, the reaction mixture is directly sprayed onto a screw of a supply portion of the vented extruder through a narrow gap such as a pore, slit or the like, most of evaporated materials are separated and withdrawn into a first vent portion kept under a pressure condition of 500 Torr or less, and then residual evaporated materials are removed at a second vent portion disposed at the downstream side of the first vent portion at 200° C. to 270° C., preferably 230° C. to 270° C., and at a pressure of 50 Torr or less. Further, a third vent portion under the conditions of 230° C. to 270° C. and 50 Torr or less may be disposed at the downstream side of the second vent portion to remove the evaporated materials. These evaporated materials contain non-reacted monomers, dimers, non-reacted mercaptan, etc.

When a monoaxial vented extruder is used as the vented extruder, the content of sulfur components which are not bound to the polymer is set to 5 ppm or less, and thus the supply amount of the reaction mixture and the size of the vent extruder are selected to satisfy the following relationship:

$$Q \leq 0.002 * \times \phi^2 \times \sqrt{(N)}$$

Here, Q: supply amount of reaction mixture [liter/hr]

φ: diameter of screw [mm]

N: rotational number of screw [rpm]

When manufacturing polymer for the core, in order to make the degasification easy, it is preferable to use mercaptan having relatively high vapor pressure such as alkylmercaptan having carbon number of 3 to 6 such as n-butylmercaptan, t-butylmercaptan or the like. In order to reduce the use amount of mercaptan, n-butylmercaptan having a large chain transfer constant is particularly preferably used.

Figure 2:
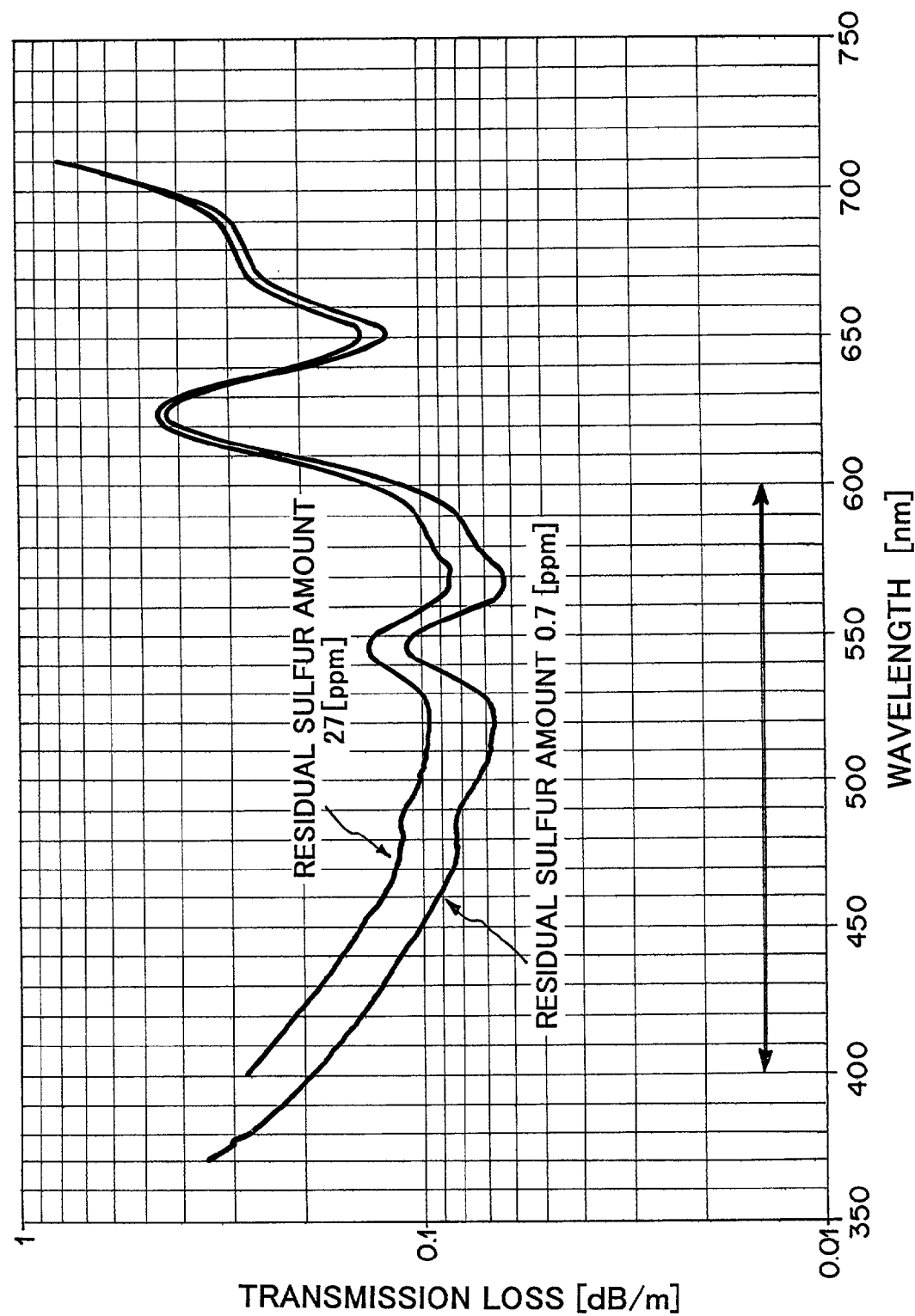
FIG. 2 is a diagram showing the wavelength-dependence of a transmission loss of a plastic optical fiber.

FIG. 2 shows a measurement result of the wavelength-dependence of the transmission loss of a plastic optical fiber using methyl methacrylate polymer as core material by using as a parameter the residual amount of sulfur atoms which are not bound to the methyl methacrylate polymer in the core.

Figure 3:
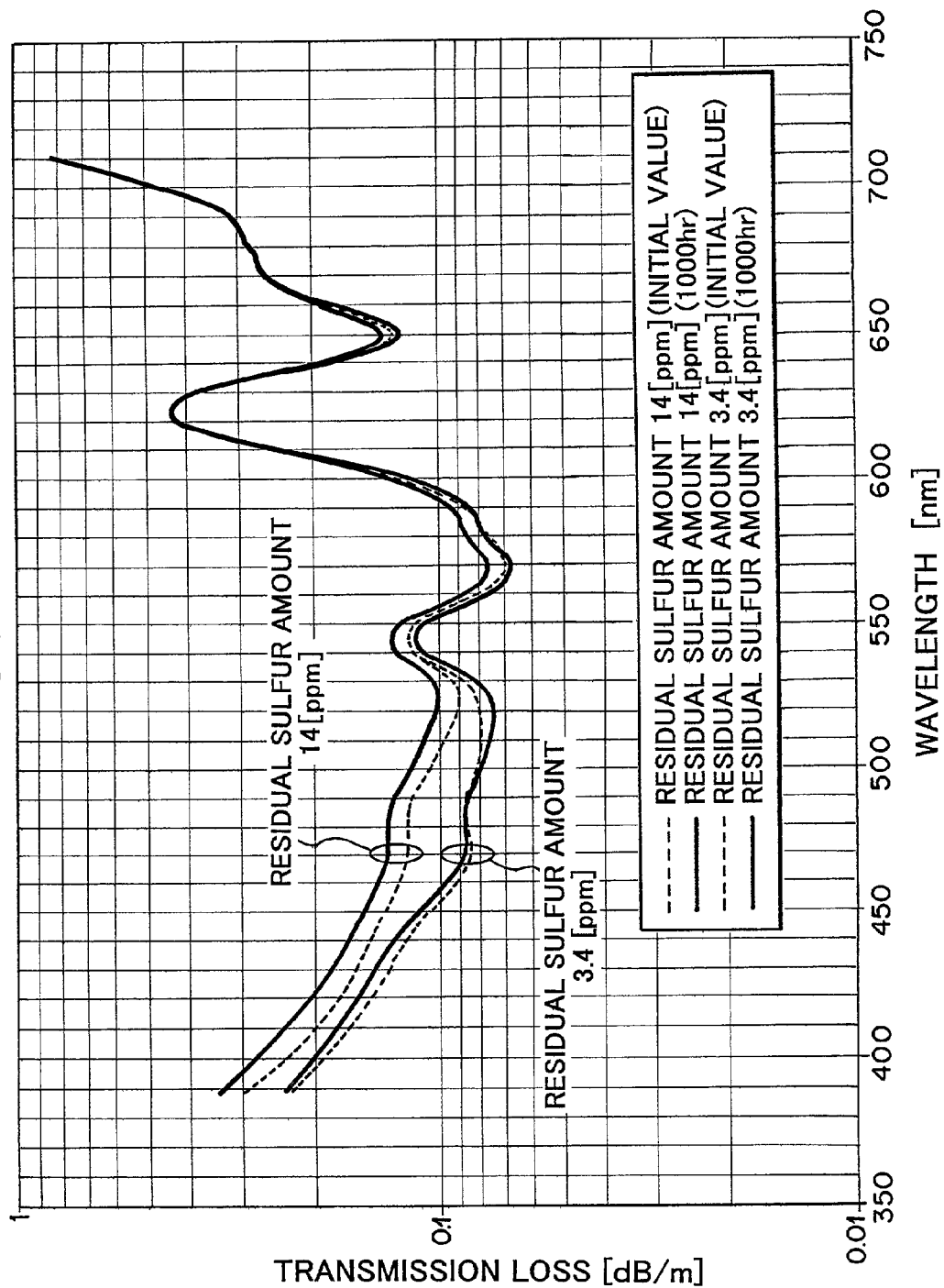
FIG. 3 is a diagram showing the wavelength-dependence of the transmission loss of the plastic optical fiber before and after a heat-resistance test.

FIG. 3 shows measurement results of the wavelength-dependence of the transmission loss before and after a heat resistance test under the conditions of 65° C. and 1000 hours by using the residual sulfur amount as parameter. FIG. 3 shows the measurement results for a plastic optical fiber in which the residual sulfur amount in the core is equal to 3.4 ppm and a plastic optical fiber in which the residual sulfur amount in the core is equal to 14 ppm. The broken lines indicate the measurement results of these plastic optical fibers before the heat resistance test, and solid lines indicate the measurement results after the heat resistance test.

As is apparent from FIG. 2, the residual sulfur amount in the core of the plastic optical fiber has little effect on the transmission loss at the red area of 640 to 670 nm in wavelength. On the other hand, in the green area of 490 to 550 nm in wavelength and in the yellow area of 560 to 590 nm in wavelength, the transmission loss can be remarkably lowered by reducing the residual sulfur amount in the core. Further, as is apparent from FIG. 3, in the red area of 640 to 670 nm in wavelength, the residual sulfur amount in the core of the plastic optical fiber has little effect on the heat resistance (the increase in the transmission loss of the plastic optical fiber after the heat resistance test). On the other hand, in the short-wavelength area of 600 nm or less in wavelength, the heat resistance can be remarkably enhanced by reducing the residual sulfur amount in the core. That is, when the optical communication apparatus is constructed by using a plastic optical fiber containing methacrylate polymer containing no benzene ring, particularly methyl methacrylate polymer, as the core material, the long-distance transmission can be performed and the heat resistance can be enhanced by using a short-wavelength light-emitting element of a green or yellow light-emitting element as the light-emitting element of the optical transmitter and also using a plastic optical fiber having a small residual sulfur amount in the core.

By using such a combination of the optical transmitter containing the green or yellow short-wavelength light-emitting element and the plastic optical fiber having a small residual sulfur amount in the core as described above, the coloring of the core in the short-wavelength area due to the thermal oxidation deterioration of sulfur atoms which is not bound to the polymer can be prevented. This is the problem induced when the conventional plastic optical fiber is used. Also the heat resistance can be enhanced. In addition to these effects, an effect that the long-distance transmission can be performed is achieved.

Further, as the methyl methacrylate polymer as the core material is preferably used polymer in which the molecular terminal structure caused by radical initiator has the following chemical formula (1):

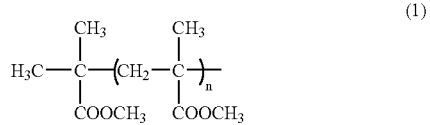

(here, n represents an integer above 1)

This molecular terminal structure is the same as that of methyl methacrylate monomer, and it suffers no effect of light absorption and light scattering due to the heterogeneous molecular structure of the radial initiator, so that such core material is particularly excellent in light-transmitting performance.

SMA type [IEC 60874-2 (Sectional specification for fibre optic connector-TypeF-SMA)] or F07 type [JIS C5976 (F07 type double core optical fiber connector)] is preferably used as a connector to optically connect a short-wavelength light-emitting element such as a yellow light-emitting element or the like to one end face of a plastic optical fiber. Further, for example, in order to perform the long-distance transmission of 150 m or more, it is preferable to reduce the connection loss between the short-wavelength light-emitting element such as a yellow light-emitting element or the like and the plastic optical fiber. Such a low connection loss can be achieved by reducing the light emission area of the short-wavelength light-emitting element such as the yellow light-emitting element or the like or reducing the numerical aperture (NA) of incident light to the optical fiber by using a lens (for example, less than NA of the optical fiber [for example, 0.5]).

A photodetecting diode having sensitivity to the short-wavelength area may be used as the photodetecting element. For example, silicon pin photodiode may be used as the photodetecting diode.

The optical receiver may be designed in a well-known structure. For example, it may be constructed by the above photodetecting element and an amplifying circuit, an identifying circuit, a demodulating circuit, etc. to process the output signal from the photodetecting element and achieve electrical signals to be output to the external.

Like the connector used to optically connect the short-wavelength light-emitting element such as the yellow light-emitting element or the like to one end face of the plastic optical fiber, SMA type or F07 type may be used as a connector to optically connect the other end face of the plastic optical fiber to the photodetecting element.

The optical communication apparatus of the present invention can transmit light through one plastic optical fiber both unidirectionally and bidirectionally. In order to perform the long-distance optical transmission, it is preferable that only light in one way is transmitted through the plastic optical fiber. In a case where the yellow light-emitting element is used as the short-wavelength light-emitting element, if the optical communication apparatus is designed so as to make light transmit only in one way through the plastic optical fiber, the optical communication apparatus thus designed can perform the long-distance optical transmission and has excellent heat resistance, and thus this design is preferable.

The embodiment of the present invention will be described in more detail with reference to the drawings.

FIG. 1 is a block diagram showing the construction of an embodiment of the optical communication apparatus according to the present invention. In FIG. 1, an optical transmitter 1 and an optical receiver 3 are optically connected to each other through a plastic optical fiber 2. An input electrical signal 11 is input from the external to the optical transmitter 1, and an output electrical signal 35 is output from the optical receiver 3 to the external. The optical coupling between the optical transmitter 1 and one end of the plastic optical fiber 2 is performed by using an SMA connector 4, and the optical coupling between the optical receiver 3 and the other end of the plastic optical fiber 2 is performed by using an SMA connector 5.

The optical transmitter 1 has a modulation circuit 12, a yellow light-emitting diode 14 and a driving circuit 13 for driving the yellow light-emitting diode 14. The modulation circuit 12 subjects the input electrical signal 11 to FSK modulation. For example, when the input electrical signal 11 is equal to 0V, it is converted to a signal of 125 kHz, and when the input electrical signal 11 is equal to 5V, it is converted to a signal of 500 kHz. The driving circuit 13 drives the yellow light-emitting diode 14, for example, at a high level of 20 mA and a low level of 0 mA on the basis of the signal from the modulation circuit 12. As the yellow light-emitting diode 14 may be used, for example, an InGaN-based diode having the maximum light emission wavelength of 570 nm, the full width at half maximum of wavelength of 38 nm and the total emission light amount of 0 dBm at a current value of 20 mA. The light emission area of the yellow light-emitting diode 14 is set to have a square of 0.2 mm in each side length, and NA of incident light to the optical fiber is set to 0.5.

The optical receiver 3 has a silicon pin photodiode 31 having sensitivity to a short-wavelength area such as a yellow area or the like, a photodetection amplifying circuit 32, an identifying circuit 33 and a demodulating circuit 34. The photodetection amplifying circuit 32 converts the output current of the silicon pin photodiode 31 to the corresponding voltage and then amplifies the voltage. The identifying circuit 33 identifies whether the signal from the photodetection amplifying circuit 32 is high level or low level. The demodulating circuit 34 demodulates the signal from the identifying circuit 33. If the signal is a 125 kHz signal, it converts the signal to 0V and outputs it as an output electrical signal 35. If the signal is a 500 kHz signal, it converts the signal to 5V and outputs it as an output electrical signal 35. The optical receiver 3 satisfies a bit error rate (BER) of $10^{-7}$ and an average minimum reception sensitivity of −41.5 dBm for NRZ signal of 20 kbps at a wavelength of 570 nm.

The plastic optical fiber 2 is designed in a step index type so as to have a core formed of polymethyl methacrylate polymer and a clad formed of copolymer of vinylidene fluoride and tetrafluoroethylene. The plastic optical fiber 2 has a residual sulfur amount of 0.7 ppm in the core, and the content of sulfur atoms bound to the polymer in the core is equal to 600 ppm. The wavelength-dependence of the transmission loss of this plastic optical fiber is shown in FIG. 2.

The measurement of the content of sulfur atoms in the polymer used for the core was carried out as follows.

(i) Measurement of Content of Sulfur Atoms bound to Polymer

The measurement was carried out by using the Dohrman microcoulometric titration apparatus MCTS-130. The measurement was made on standard samples for which the sulfur atom concentration have been known to create a calibration curve. Subsequently, the polymer used for the core was solved in acetone whose amount is ten times as large as the polymer, and the solution was dropped into methanol to precipitate the polymer. Only the polymer was separated and withdrawn, and then dried to obtain a polymer sample. The polymer sample was measured, and the value read on the basis of the calibration curve was converted to a value per polymer unit amount, and this value was regarded as the amount of sulfur atoms bound to the polymer.

(ii) Measurement of Content of Sulfur Atoms not bound to Polymer

Gas Chromatograph 5890 SERIES (II) produced by HP company was used as a measuring apparatus, and TC-WAX produced by GL Sciences Inc. having 30 m in length, 0.53 mm in inner diameter and 1.0 µm in thickness was used as a column. A flame photometry detector having high sensitivity to sulfur was used as a detector to carry out quantitative analysis of n-butyl mercaptan or n-octyl mercaptan and disulfide compounds generated through the reaction between these mercaptans, which remain in the polymer. The quantitative analysis was carried out as follows. That is, acetone was used as solvent, and standard liquid whose concentration was known was measured in advance to create a calibration curve. Thereafter, sample liquid in which the polymer was solved at a polymer concentration of about 13 wt/vol % was measured, a quantitative value obtained from the calibration curve was converted to a value in terms of sulfur atoms, and the value thus obtained was set as the content of sulfur atoms which were not bound to the polymer.

When n-butyl mercaptan was used, the total value of the values in terms of sulfur atoms for n-butyl mercaptan and di-n-butyl-disulfide was regarded as the content of sulfur atoms which were not bonud to the polymer. When n-octyl mercaptan was used, the total value of the values in terms of sulfur atoms for n-octyl mercaptan and di-n-octyl-disulfide was regarded as the content of sulfur atoms which were not bound to the polymer.

The transmission loss measured with collimated light of 570 nm in wavelength was equal to 0.06 dB/m. The transmission loss when the optical transmitter 1 was connected was increased up to 0.1 dB/m because the loss due to the spreading of the wavelength of the light emission diode 14 and increase of loss caused by higher mode components.

The yellow light-emission diode 14 is optically coupled to one end of the plastic optical fiber 2 by the SMA connector 4. The average transmission level of the optical transmitter 1 (the light amount level under the state that the modulation is applied after 1-m transmission through the optical fiber is carried out) is equal to −9 dBm.

The silicon pin photodiode 31 is optically coupled to the other end of the plastic optical fiber 2 by the SMA connector 5.

A transmission experiment and a heat resistance test were carried as follows by using an optical communication apparatus as described with reference to FIG. 1 and an optical communication apparatus obtained by partially modifying the former optical communication apparatus.

EXAMPLE 1

Figure 4:
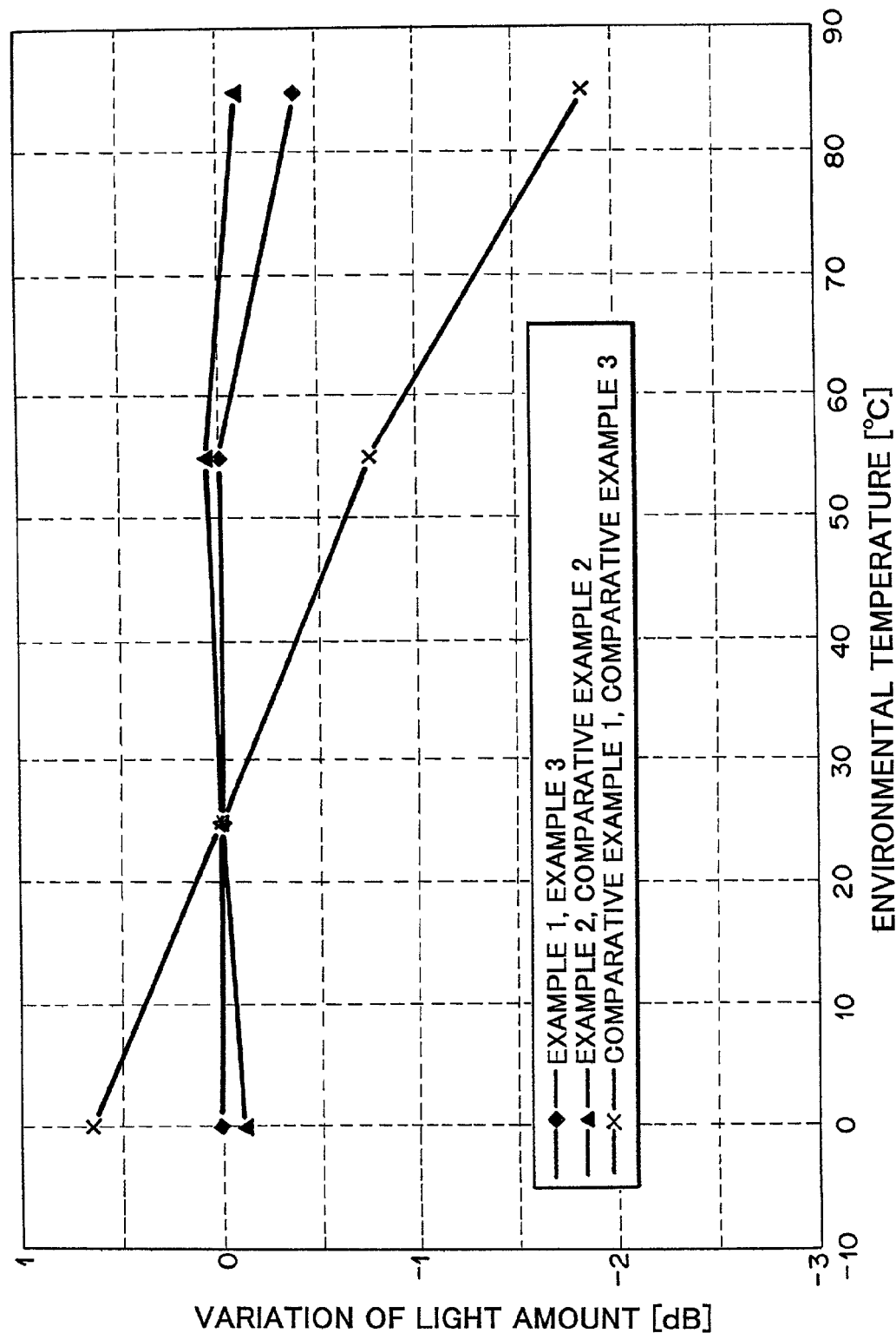
FIG. 4 is a diagram showing the temperature characteristic of transmission level.

The optical communication apparatus shown in FIG. 1 was disposed in a thermostat, and the temperature characteristic at the transmission level was measured. FIG. 4 shows the result thereof. In FIG. 4, the light amount level at a temperature of 25° C. is indicated as 0 dB. In the optical communication apparatus used, it was confirmed that the transmission level was stable in a broad temperature range of 0 to 85° C. and the heat resistance was excellent.

Next, the transmission loss characteristic of the plastic optical fiber 2 used for the optical communication apparatus at 85° C. under a dry condition was measured with respect to the time. As a result, no increase of the transmission loss at 570 nm in wavelength was observed after 1000 hours.

From the above result, it was found that in the optical communication apparatus used in Example 1, both the light-emitting element and the optical fiber had excellent heat resistance, and 300 m long-distance transmission could be performed in 20 kbps NRZ signal transmission (the bit error rate in the digital signal transmission was equal to or less than $10^{-7}$: the same is achieved with respect to the transmissible distance in the following description).

EXAMPLE 2

The optical communication apparatus was designed in the same construction as Example 1 except that a green light emission diode was used in place of the yellow light emission diode 14.

The green light emission diode used was based on InGaN type, and at the current value of 20 mA, the maximum light emission wavelength was equal to 525 nm, the full width at half maximum was equal to 20 nm, and the total emitted light amount was equal to 3 dB. The average transmission level of the optical transmitter 1 was equal to −7 dBm. The average minimum photodetecting sensitivity of the optical receiver 3 satisfying BER of $10^{-7}$ or less in the 20 kbps NRZ signal transmission was equal to −41.0 dB at the wavelength of 525 nm.

Like Example 1, the heat resistance test of the optical communication apparatus was carried out. FIG. 4 shows the result thereof. In the optical communication apparatus used in Example 2, it was found that the transmission level was stable in a broad temperature range from 0 to 85° C., and the heat resistance was excellent.

Like Example 1, the transmission loss characteristic of the plastic optical fiber 2 was measured with respect to the time. As a result, no increase of the transmission loss of the optical fiber at the wavelength of 525 nm was observed after 1000 hours.

From the above result, it was found that in the optical communication apparatus used in Example 2, both the light emitting element and the plastic optical fiber had excellent heat resistance and 320 m long-distance transmission could be performed in 20 kbps NRZ signal transmission.

EXAMPLE 3

The optical communication apparatus was designed in the same construction as Example 1 except for use of a plastic optical fiber 2 in which the residual sulfur amount in the core was equal to 27 ppm and the content of sulfur atoms bound to the polymer was equal to 590 ppm (the wavelength-dependence of the transmission loss is shown in FIG. 2).

The transmission loss measured with collimated light at the wavelength of 570 nm was equal to 0.09 dB/m. The transmission loss when the optical transmitter 1 was connected was increased up to 0.13 dB/m because the loss due to the spreading of the wavelength of the yellow light-emitting diode 14 and increase of loss caused by higher mode components.

Like Example 1, the transmission loss characteristic of the plastic optical fiber 2 was measured with respect to the time. As a result, an increase of the transmission loss of about 0.005 dB/m at the wavelength of 570 nm was observed after 1000 hours.

From the above result, the heat resistance characteristic of the optical fiber in the optical communication apparatus used in Example 3 is lower than Example 1, however, the reduction degree is permissible to the actual use of the optical fiber, and thus the heat resistance can be judged as being good. Further, 240 m transmission can be performed in the 20 kbps NRZ signal transmission, and even if the thermal deterioration at 85° C. in 10,000 hours estimated on the basis of the heat resistance test result is taken into consideration, the transmission distance is equal to 180 m.

Comparative Example 1

The optical communication apparatus was designed in the same construction as Example 1 except that a red light emission diode was used in place of the yellow light emission diode 14.

The red light emission diode used here was based on GaAlAs type, and at the current value of 20 mA, the maximum light emission wavelength was equal to 660 nm, the full width at half maximum was equal to 20 nm, and the total emitted light amount was equal to 6 dBm.

As shown in FIG. 2, the transmission loss of the plastic optical fiber 2 at the wavelength of 660 nm was equal to 0.17 dB/m. However, when the optical transmitter 1 was connected, the transmission loss became to 0.23 dB/m because of spreading of the wavelength of the light emission diode and increase of the loss caused by higher mode components. The average transmission level of the optical transmitter 1 was equal to –6 dBm. The average minimum photodetecting sensitivity of the optical receiver 3 satisfying BER of $10^{-7}$ in the 20 kbps NRZ signal transmission was equal to –43.0 dB at the wavelength of 660 nm.

Like Example 1, the heat resistance test of the optical communication apparatus was carried out with respect to the time. FIG. 4 shows the test result. In the optical communication apparatus used in Comparative Example 1, the transmission level was greatly varied to 2.5 dB in the temperature range from 0 to 85° C.

Like Example 1, the transmission loss characteristic of the plastic optical fiber 2 was measured with respect to the time. As a result, no increase of the transmission loss of the optical fiber at the wavelength of 660 nm was observed after 1000 hours.

From the above result, it was found that in the optical communication apparatus used in Comparative Example 1 the heat resistance characteristic of the light-emitting element was deteriorated and only the transmission of 150 m or less can be performed in the 20 kbps NRZ signal transmission. Further, when expecting the temperature variation of the transmission level in the range from 0 to 85° C., the transmission distance was expected as 140 m.

Comparative Example 2

The optical communication apparatus was designed in the same construction as Example 2 except that in the optical fiber 2 being used, the residual sulfur amount in the core was equal to 27 ppm, and the content of sulfur atoms bound to the polymer was equal to 590 ppm (FIG. 2 shows the wavelength-dependence of the transmission loss).

At the wavelength of 525 nm, the transmission loss measured with collimated light was equal to 0.09 dB/m. When the optical transmitter 1 was connected, the transmission loss was increased up to 0.13 dB/m due to the spreading of the wavelength of the light emission diode 14 and the increase of the loss caused by the higher mode components.

Like Example 1, the transmission loss characteristic of the plastic optical fiber 2 was measured with respect to the time. As a result, it was found that increase of the transmission loss of about 0.018 dB/m at the wavelength of 525 nm was observed after 1000 hours.

From the above result, it was found that in the optical communication apparatus used in Comparative Example 3, the heat resistance characteristic of the optical fiber was deteriorated, and 240 m transmission can be performed in the 20 kbps NRZ signal transmission. However, from the heat resistance test result, it was also found that when expecting the thermal deterioration of 85° C. in 10,000 hours, the transmission distance was expected as 100 m.

Comparative Example 3

The optical communication apparatus was designed in the same construction as Comparative Example 2 except that in the optical fiber 2 being used, the residual sulfur amount in the core was equal to 27 ppm, and the content of sulfur atoms bound to the polymer was equal to 590 ppm (FIG. 2 shows the wavelength-dependence of the transmission loss).

At the wavelength of 660 nm, the transmission loss measured with collimated light was equal to 0.18 dB/m. When the optical transmitter 1 was connected, the transmission loss was increased up to 0.24 dB/m due to the spreading of the wavelength of the light emission diode 14 and the increase of the loss caused by the higher mode components.

Like Example 1, the transmission loss characteristic of the plastic optical fiber 2 was measured with respect to the time. As a result, no increase of the transmission loss of the optical fiber at the wavelength of 660 nm was observed after 1000 hours.

From the above result, it was found that in the optical communication apparatus used in Comparative Example 3, the heat resistance characteristic of the light-emitting element was deteriorated and only the transmission of 150 m or less could be performed. Further, it was found that when expecting the temperature variation of the transmission level in the range from 0 to 85° C., the transmission distance was expected as 140 m.

The following table 1 shows the summarized results of Examples 1 to 3 and Comparative Examples 1 to 3.

TABLE 1

|  | EXAMPLE | | | COMPARATIVE EXAMPLE | | |
|---|---|---|---|---|---|---|
|  | 1 | 2 | 3 | 1 | 2 | 3 |
| OPTICAL TRANSMITTER | | | | | | |
| LIGHT SOURCE COLOR (WAVELENGTH [nm]) | Yellow (570) | Green (525) | Yellow (570) | Red (660) | Green (525) | Red (660) |
| AVERAGE TRANSMISSION LEVEL | −9 | −7 | −9 | −6 | −7 | −6 |
| OPTICAL RECEIVER (20 kbps) | | | | | | |
| MAXIMUM RECEPTION SENSITIVITY [dBm] | Above −9 | Above −7 | Above −9 | Above −6 | Above −7 | Above −6 |
| MINIMUM RECEPTION SENSITIVITY [dBm] | −41.5 | −41.0 | −41.5 | −43.0 | −41.0 | −43.0 |
| OPTICAL FIBER | | | | | | |
| RESIDUAL SULFUR AMOUNT [ppm] | 0.7 | 0.7 | 27.0 | 0.7 | 27.0 | 27.0 |
| TRANSMISSION LOSS [dB/m] | 0.06 | 0.07 | 0.09 | 0.17 | 0.09 | 0.18 |
| TRANSMISSION DISTANCE [m] | | | | | | |
| ROOM TEMPERATURE | 300 | 320 | 240 | 150 | 240 | 150 |
| ESTIMATION AT 85° C. IN 10,000 HOURS | 300 | 320 | 180 | 140 | 100 | 140 |
| HEAT RESISTANCE | | | | | | |
| LIGHT-EMITTING ELEMENT | EXCELLENT | EXCELLENT | EXCELLENT | BAD | EXCELLENT | BAD |
| OPTICAL FIBER | EXCELLENT | EXCELLENT | GOOD | EXCELLENT | BAD | EXCELLENT |

In the table 1, the transmission level is the light amount level under the state that modulation is applied after 1 m transmission of the optical fiber, the reception sensitivity is the light amount level at which the bit error rate is equal to $10^{-7}$ or more, the transmission loss is a measurement value for monochromatic collimated light, and the transmission distance is the maximum transmission distance at which the bit error rate is equal to $10^{-7}$ or less.

EXAMPLE 4

The optical communication apparatus was designed in the same construction as Example 1 except that a multi-core type plastic optical fiber was used as the plastic optical fiber 2.

The multi-core type plastic optical fiber used here is an optical fiber having island-sea structure in which 37 island portions are unified with a common sea portion while the island portions are separated from one another. Each island portion comprises a core and a clad. The core is formed of methyl methacrylate polymer, and the clad and the sea portion are formed of the copolymer of vinylidene fluoride and tetrafluoroethylene. In the multi-core type plastic optical fiber, the residual sulfur amount in the core was equal to 0.8 ppm, and the content of sulfur atoms bound to the polymer in the core was equal to 600 ppm.

At the wavelength of 570 nm, the transmission loss measured with collimated light was equal to 0.06 dB/m. When the optical transmitter 1 was connected, the transmission loss was increased to 0.1 dB/m due to the spreading of the wavelength of the light emission diode 14 and the increase of the loss caused by the higher mode components. The average transmission level of the optical transmitter 1 was equal to −10 dBm.

Like Example 1, the transmission loss characteristic of the multi-core type plastic optical fiber used here was measured with respect to the time, and as a result, no increase of the transmission loss of the optical fiber at the wavelength of 570 nm was observed after 1000 hours.

From the above result, it was found that in the optical communication apparatus used in Example 4, both the light-emitting element and the optical fiber had excellent heat resistance characteristic and the long-distance transmission of 290 m could be performed in the 20 kbps NRZ signal transmission.

EXAMPLE 5

The optical communication apparatus was designed in the same construction as Example 1 except that a multi-layered plastic optical fiber was used as the plastic optical fiber 2.

The multi-layered plastic optical fiber used here was designed in a multilayered structure so that the refractive index of the core was stepwise reduced from the center of the core toward the periphery thereof. The inner layer of the core was formed of methyl methacrylate polymer, the outer layer of the core was formed of the copolymer of methyl methacrylate and 2,2,3,3-tetrafluoropropyl methacrylate, and the clad was formed of the polymer of methyl methacrylate and 1,1,2,2-tetrahydroperfluorodecyl methacrylate. The diameter of the inner layer of the core was equal to 450 μm, the thickness of the outer layer of the core was equal to 135 μm, the thickness of the clad was equal to 15 μm and the fiber diameter was equal to 750 μm. In the multi-layered plastic optical fiber, the residual sulfur amount in the inner layer of the core was equal to 0.7 ppm, and the residual sulfur amount in the outer layer of the core was equal to 1ppm. The content of sulfur atoms bound to the polymer in the inner layer of the core was equal to 600 ppm while the content of sulfur atoms bound to the polymer in the outer layer of the core was equal to 560 ppm.

At the wavelength of 570 nm, the transmission loss measured with the collimated light was equal to 0.06 dB/m. When the optical transmitter 1 was connected, the transmission loss was increased to 0.1 dB/m due to the spreading of the wavelength of the light emission diode 14 and the increase of the loss caused by the higher mode components. The average transmission level of the optical transmitter 1 was equal to −14 dBm.

Like Example 1, the transmission loss characteristic of the multi-layered plastic optical fiber used here was measured with respect to the time, and as a result, no increase of the transmission loss of the optical fiber at the wavelength of 570 nm was observed after 1000 hours.

From the above result, it was found that in the optical communication apparatus used in Example 5, both the light emitting element and the optical fiber had excellent heat resistance and the long-distance transmission of 250 m could be performed in the 20 kbps NRZ signal transmission.

As described above, in the case of the optical communication apparatus using the red light emission diode of the maximum light emission wavelength of 660 nm, the transmission distance is short, and the heat resistance of the light emitting element is deteriorated. Even when the residual sulfur amount in the core of the plastic optical fiber is reduced, it has little effect on the transmission distance and the heat resistance. On the other hand, in the case of the optical communication apparatus using the yellow light emission diode having the maximum light emission wavelength of 570 nm and the green light emission diode having the maximum light emission wavelength of 525 nm, by reducing the residual sulfur amount in the core of the plastic optical fiber, the transmission distance can be greatly increased and also the heat resistance can be enhanced.

As described above, it has been found that the optical communication apparatus of the present invention is effective to increase the transmission distance and enhance the heat resistance by using the short-wavelength light-emitting element and using the plastic optical fiber including a small residual sulfur amount in the core thereof.

INDUSTRIAL APPLICABILITY

As described above, according to the present invention, the optical communication apparatus is constructed by using, in combination, a short-wavelength light-emitting element and a plastic optical fiber having a core formed of methacrylate polymer which is free from benzene ring and has a residual sulfur amount of 5 ppm or less, and therefore the long-distance transmission can be performed with excellent heat resistance.

Further, according to the present invention, the optical communication apparatus is constructed by using, in combination, a yellow light emission element and a plastic optical fiber formed of methacrylate polymer free from benzene ring so that the plastic optical fiber makes light transmit in only one direction. Therefore, the heat resistance is enhanced and the long-distance transmission can be performed.

What is claimed is:

1. An optical communication apparatus, comprising:
   an optical transmitter having a short-wavelength light-emitting element for emitting light signals corresponding to electrical signals input from the outside by using light emitted from said short-wavelength light-emitting element;
   a plastic optical fiber having a core made of methacrylate polymer free from benzene rings, an amount of sulfur atoms that are not bound to the methacrylate polymer in said core being set to 5 ppm or less, one end of said optical fiber being optically coupled to said short-wavelength light-emitting element; and
   an optical receiver having a photodetecting element coupled optically to the other end of said plastic optical fiber and adapted to generate an output electrical signal in accordance with the output of said photodetecting element.

2. The optical communication apparatus as claimed in claim 1, wherein the amount of sulfur atoms that are not bound to the methacrylate polymer in said core is set to 3 ppm or less.

3. The optical communication apparatus as claimed in claim 1, wherein the amount of sulfur atoms that are bound to the methaclylate polymer in said core is set to a value in the range from 200 to 1000 ppm.

4. The optical communication apparatus as claimed in any one of claims 1 to 3, wherein said short-wavelength light-emitting element emits light having the maximum light emission wavelength of 600 nm or less.

5. The optical communication apparatus as claimed in any one of claims 1 to 3, wherein said short-wavelength light emitting element is a yellow light-emitting diode for emitting light having the maximum light emission wavelength of 560 to 590 nm.

6. The optical communication apparatus as claimed in any one of claims 1 to 3, wherein said short-wavelength light emitting element is a green light-emitting diode for emitting light having the maximum light emission wavelength of 490 to 550 nm.

7. An optical communication apparatus, comprising:
   an optical transmitter having a yellow light-emitting element for emitting light signals corresponding to electrical signals input from the outside by using light emitted from said yellow light-emitting element;
   a plastic optical fiber having a core made of methacrylate polymer free from benzene rings, one end of said optical fiber being optically coupled to said yellow light-emitting element; and
   an optical receiver having a photodetecting element coupled optically to the other end of said plastic optical fiber and adapted to generate an output electrical signal in accordance with the output of said photodetecting element, wherein said plastic optical fiber is designed so that light propagates in only one direction; and
   wherein the amount of sulfur atoms that are not bound to the methacrylate polymer in said core is set to 5 ppm or less.

8. The optical communication apparatus as claimed in claim 7, wherein the amount of sulfur atoms that are not bound to the methacrylate polymer in said core is set to 3 ppm or less.

9. The optical communication apparatus as claimed in claim 7, wherein said yellow light-emitting element comprises a light emission diode which has the maximum light emission wavelength in the range from 560 nm to 590 nm, the full width at half maximum of wavelength of 40 nm or less and the total emission light amount of 0 dBm or more.

10. The optical communication apparatus as claimed in any one of claims 7 to 9, wherein said plastic optical fiber has a transmission loss of 0.1 dB/m or less at the wavelengths of 560 to 590 nm, and the connection loss between said yellow light-emitting element and said plastic optical fiber is equal to 10 dB or less.

11. The optical communication apparatus as claimed in any one of claims 7 to 9, wherein said optical receiver has the minimum reception sensitivity of −25 dBm or less at the wavelengths of 560 to 590 nm.

* * * * *

UNITED STATES PATENT AND TRADEMARK OFFICE
CERTIFICATE OF CORRECTION

PATENT NO. : 7,039,322 B1  Page 1 of 1
APPLICATION NO. : 09/868994
DATED : May 2, 2006
INVENTOR(S) : Yoshimura et al.

It is certified that error appears in the above-identified patent and that said Letters Patent is hereby corrected as shown below:

On Title Page, Item (22) col. 1 should read,
PCT Filed: --Dec. 21, 1999 --

Signed and Sealed this

Fifteenth Day of August, 2006

JON W. DUDAS
*Director of the United States Patent and Trademark Office*